(12) United States Patent
Bahns et al.

(10) Patent No.: US 8,835,805 B2
(45) Date of Patent: Sep. 16, 2014

(54) METHOD FOR PATTERNING NANO PARTICLES

(75) Inventors: John T. Bahns, DeKalb, IL (US); Liaohai Chen, Darien, IL (US); Stephen K. Gray, Wheaton, IL (US); Subramanian Sankaranarayanan, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 171 days.

(21) Appl. No.: 13/249,865

(22) Filed: Sep. 30, 2011

(65) Prior Publication Data
US 2013/0084451 A1    Apr. 4, 2013

(51) Int. Cl.
*B23K 26/06* (2014.01)
*B23K 26/34* (2014.01)
*B32B 5/16* (2006.01)

(52) U.S. Cl.
CPC . *B23K 26/06* (2013.01); *B32B 5/16* (2013.01); *B32K 26/34* (2013.01)
USPC ............ 219/121.73; 219/121.63; 219/121.64; 419/4

(58) Field of Classification Search
USPC .............................................. 419/4
See application file for complete search history.

(56) References Cited

U.S. PATENT DOCUMENTS

| 7,419,887 B1 * | 9/2008 | Quick et al. .................. 438/479 |
| 2008/0213542 A1 * | 9/2008 | Huo et al. ..................... 428/172 |

OTHER PUBLICATIONS

J.T. Bahns, et al.,Optically Directed Assembly of Continuous Mesoscale Filaments, Physical Review Letters, 106 (2011), pp. 095501-1 to 099501-4.

* cited by examiner

*Primary Examiner* — George Wyszomierski
*Assistant Examiner* — Ngoclan T Mai
(74) *Attorney, Agent, or Firm* — Cherskov Flaynik & Gurda, LLC (57) ABSTRACT

The invention provides a simple and inexpensive method to assemble nanomaterials into millimeter lengths. The method can be used to generate optical, sensing, electronic, magnetic and or catalytic materials. Also provided is a substrate comprised of fused nanoparticles. The invention also provides a diode comprised of assembled nanoparticles.

27 Claims, 10 Drawing Sheets

METHOD FOR PATTERNING NANO PARTICLES

CONTRACTUAL ORIGIN OF THE INVENTION

The U.S. Government has rights in this invention pursuant to Contract No. DE-AC02-06CH11357 between the United States Government and UChicago Argonne, LLC, representing Argonne National Laboratory.

BACKGROUND OF THE INVENTION

1. Field of the Invention

The present invention relates to a method for manipulating nanoparticles, and more specifically the present invention relates to a method for using radiation to directly assemble and fuse nanoparticles into larger scale structures.

2. Background of the Invention

In microelectronics, device performance is strongly related to the microstructure and patterns of electrically-conductive channels. In the field of organic electronics, for example, the creation of high-conductivity and high-resolution microcircuits is a major challenge. Typical conductivities of soft organic materials are $\sim 10^{-6}$ S/cm, limiting their practical implementation in electronics. On the other hand, conventional electronics is based on solid inorganic materials with very high conductivities ($\sim 10^3$-$10^5$ S/cm) but with limited mechanical robustness and flexibility.

The controlled synthesis or fabrication of complex materials and devices from nanoparticles (NPs) is a major goal of modern nanoscience. NP assembly is carried out either with top-down or bottom-up approaches. Top-down approaches involve depositing, patterning, and etching material layers. These invasive procedures typically rely on control of damage, and as the structures approach smaller length scales, the increased number of manufacturing defects makes device operation problematic.

Of bottom-up techniques, printing is the most widespread method. However, printing cannot fabricate effectively at small length scales without special surface templating. Other bottom-up methods include trapping individual NPs and nanowires using applied electromagnetic fields, or ligands. Post-synthesis assembly techniques for integration into high-density device assemblies include electric and magnetic-field-assisted alignment, optical and optoelectronic tweezers, micro-fluidic flow channels and micro contact printing. These methods involve multiple steps and can be limited by low deposition rates, lack of permanent bonding mechanism, and low electrical conductivity of the resulting microcircuits.

However, controlled synthesis of "user-designed" architectures from colloidal NPs that extend over microscopic and mesoscopic length scales is challenging due to a lack of understanding of the growth mechanisms and parameters defining the final architecture. Other challenges are the stability of the assembled NPs and the fact that surfactant layers might limit the durability of mesoscopic aggregations.

Lithographic techniques are currently used for nano-patterning. Expensive equipment and processes are used to create the patterns. The techniques are limited in the material choices, size, scale and patterning speed.

Other processes exist for manipulating large particles (i.e., between 2 and 15 microns in size) of compounds. These processes produce nanowires solely of the compounds, which are bound together by van der Waal's forces. The structures which result from such large particle manipulation are not porous and not stable. Also, the use of large particles prevents the creation of patterns and fine detail structure.

A need exists in the art for a process for providing controlled irreversible assembly of stable NP structures with intricate shapes and arbitrary sizes. The process should allow for fine-tuning of the forces which drive the assembly so as to enhance surface area and porosity of the resulting structures. Also, the process should allow for real time fabrication and manipulation of resulting assemblies, all using low power, and therefore less hazardous, energy sources.

SUMMARY OF INVENTION

An object of the invention is to provide a process for manipulating nanoparticles that overcomes many of the disadvantages of the prior art.

Another object of the invention is to provide a process for patterning large scale structures (e.g., larger than $10^{-3}$ meters) utilizing particles with sizes ranging from 2.5 nm to 1000 nm. A feature of the process is that the particles are directly manipulated optically and in real time. An advantage of the invention is that the small-size particles facilitate efficient absorption of heat from low energy sources (e.g., below 20 mW lasers) to facilitate convection movement of the particles. Another advantage is that the fused particle structures, once so assembled, remain assembled after removal of the optical field source.

Still another object of the present invention is to provide a process for creating continuous meso/macroscale composites comprising nanoparticles of metallic and nonmetallic elements with same or different chemical and physical properties, rendering the resulting structures with different geometries and functions at various regions of the structures. A feature of the invention is using convective flow generated by the application of incoming energy, such as a laser, to cause the metal and nonmetallic particles to form filament subunits which can be further manipulated to form larger structures. An advantage of the process is that the filaments are formed simultaneous with application of energy which creates the convective flow and without the need for an annealing step.

Yet another object of the present invention is to provide a method for positioning and patterning nanoparticle systems. A feature of the invention is using light to form structures from the particles in real time, the formation occurring within or near the focus of the light. An advantage of the invention is that the light serves as a means to provide energy to impart convective flow to the particles while simultaneously fusing the particles together. The method enables the adherence of nanoparticles to each other to form coherent structures.

Another object of the invention is to provide two-dimensional and three-dimensional structures (at the mesoscale level, i.e, from $10^{-7}$ meters to $10^{-4}$ meters in size) comprising nanoparticles. A feature of the invention is that the structures are comprised from smaller particles, with one type of particle being a principal energy absorber that serves as a means for irreversibly agglomerating other nanoparticles, such as electrically conducting particles together. An advantage of the invention is that the energy absorber particles and the other nanoparticles are physically and or chemically bound to each other so as to confer high stability to the structure such that the structure can repeatedly withstand sonic, mechanical, and electrical stresses. Another advantage is that the structures, which can be comprised of several million nanoparticles, are not single component structures, rather are hybrid structures of different elements, different particle sizes, each having different electrical and mechanical characteristics.

Briefly, the invention provides for a method for manipulating and fusing nanoparticles, the method comprising providing a solution of suspended colloidal nanoparticles, contacting a laser to the colloidal solution for a time and at a power level sufficient to cause the nanoparticles to attach to each other; and moving the laser to direct attachment of additional nanoparticles so as to produce a continuous filament. At higher powers and higher concentrations of nanoparticles, the fused nanoparticles adhere to the solution's support substrate, thereby allowing formation of 2-dimensional and 3-dimensional patterns, such as circuits.

Also provided is a multi-dimensional structure produced by the aforesaid method for manipulating nanoparticles.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides organic-inorganic materials and a method for making organic-inorganic mesoscale structures using nanoparticles selected in size from about 2.5 nm to 1000 nm, and preferably from about 50 to 200 nm. Generally, the nanoparticles are assembled or otherwise manipulated into structures as long as one cm. The manipulation is irreversible and remains intact after removal or cessation of the radiation input. Suitable radiation includes that which the nanoparticles absorb. Exemplary radiation types include visible light (at wavelengths between 400 and 700 nm), although infra-red light, ultra-violet light, microwave radiation, neutron beams, heat probes, sonic/acoustic waves, near field electromagnetic radiation, and combinations thereof are also suitable if applied at a sufficient level to cause heating of the particles. Generally, two types of particles are involved; a "main absorber" (generally nonmetallic) that acts as a glue, and another type of particle (generally metallic) that is relatively less of a radiation absorber.

Radiation is used to directly manipulate and fuse the particles to whatever shape or structure desired, the manipulation occurring in real time. This fusion occurs due to the wetting of the metal particles by the primary radiation absorber particles. The resulting network is the result of physical (e.g. van der Waals) interactions and chemical interactions.

An embodiment of the invented method provides for continuous filament formation, the method comprising positioning a laser in close spatial relationship to a solution containing nanoparticles. The laser/solution interaction enables optical trapping, hydrothermically controlled interactions and chemical interactions which leads to the synthesis of filaments having arbitrary shapes and sizes. The resulting mesoscale structures do not require the presence of a capping layer and are irreversibly formed, i.e., after the radiation such as laser is removed, the structures remain intact.

Figure 1:
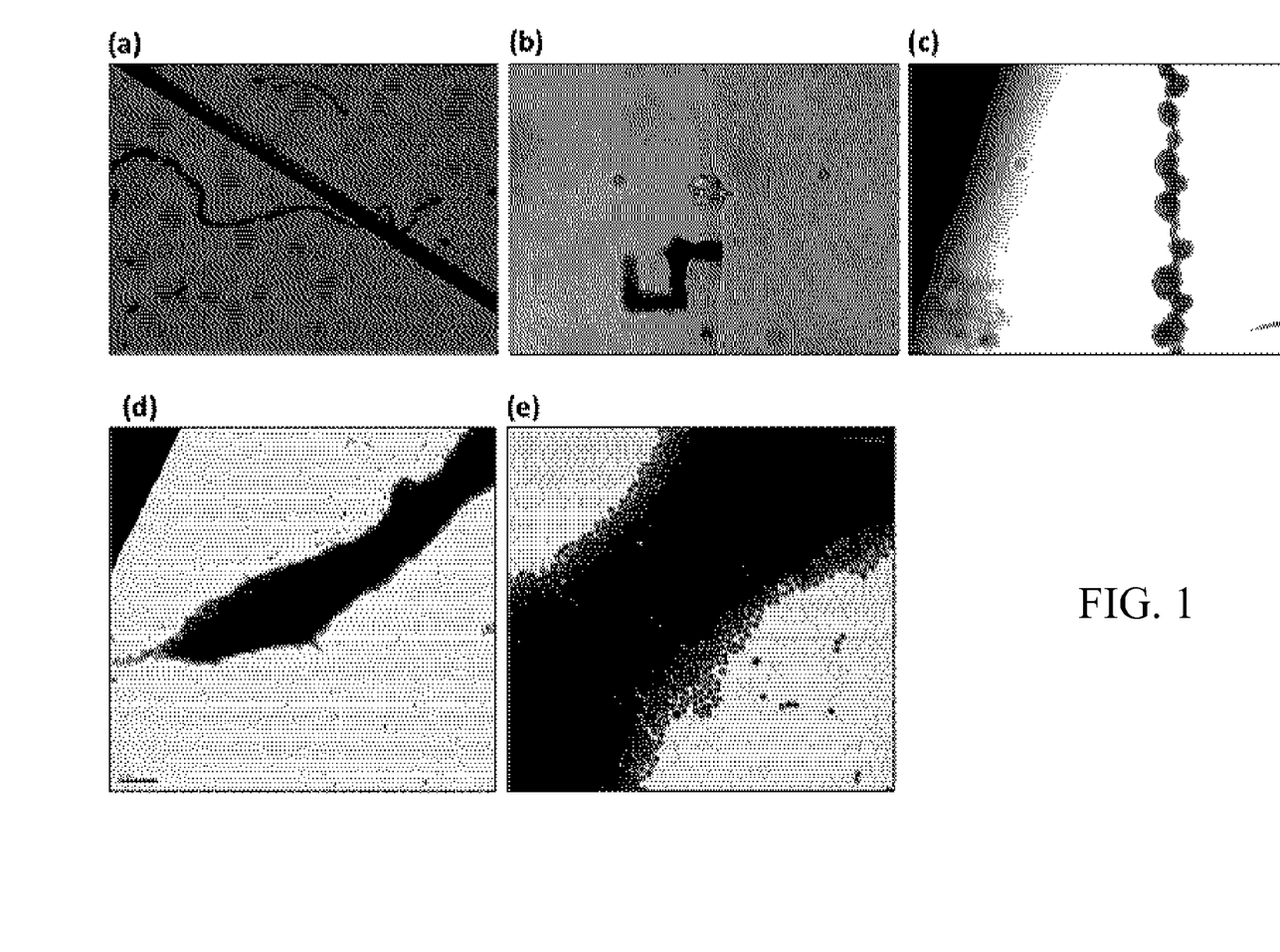
FIGS. 1A-E are photomicrographs of ODA assembled filaments, in accordance with features of the present invention.
FIGS. 1F-1G are schematic drawings of convective vectoring of nanoparticles, in accordance with features of the present invention.

The invented process generates filaments and structures comprised of single phase nanoparticles and/or multi-phase structures wherein several different metallic and nonmetallic particles are agglomerated. The filaments or other structures can serve as building blocks for continuous solid mesostructures. These various shapes and sizes are shown in photomicrographs depicted in FIGS. 1A-1E. FIG. 1A is an optical image of a gold/carbon filament obtained with a stationary optical trap. The thick black feature is a 7 micron diameter carbon fiber.

FIG. 1B depicts a hook-shaped gold/carbon structure which was formed by translation of the convection trap. Translation speeds will vary at from 1 to $10^9$ micrometers per second. For example, at about 1 milliWatt laser power and at particle concentrations of about $10^{11}$ NP/cm$^3$, the trap is moved about 1 to 10 micrometers per second. FIG. 1C depicts a lobe-shaped filament formed by translating the trap with varying speeds. The inventors found that slower speeds cause larger filament diameters, and vice versa.

FIG. 1D is a transmission electron microscopy (TEM) image of a filament grown on a TEM grid. The sharp tip indicates where the filament stopped growing due to local colloid depletion. Convection currents are used to control the NP concentrations which are just adjacent to the radiation locus. This control of NP concentration therefore controls filament growth. The magnitude of the convection velocities are dependent on the NP heating which in turn depends on the laser power input. So, regulation of laser power input can be used to control filament growth. While convection is a principal means for transporting the NPs, in other means of convection are suitable (e.g flows of colloids generated with a pump).

FIG. 1E is a detailed view of FIG. 1D, showing a dense neck or tapering of a middle portion of the filament. This feature illustrates how filament radical dimensions are influenced by the radial component of the trap potential, that radial component defined as the portion of the applied optical force that is directed at right angles to the filament's long axis.

Figure 1F:
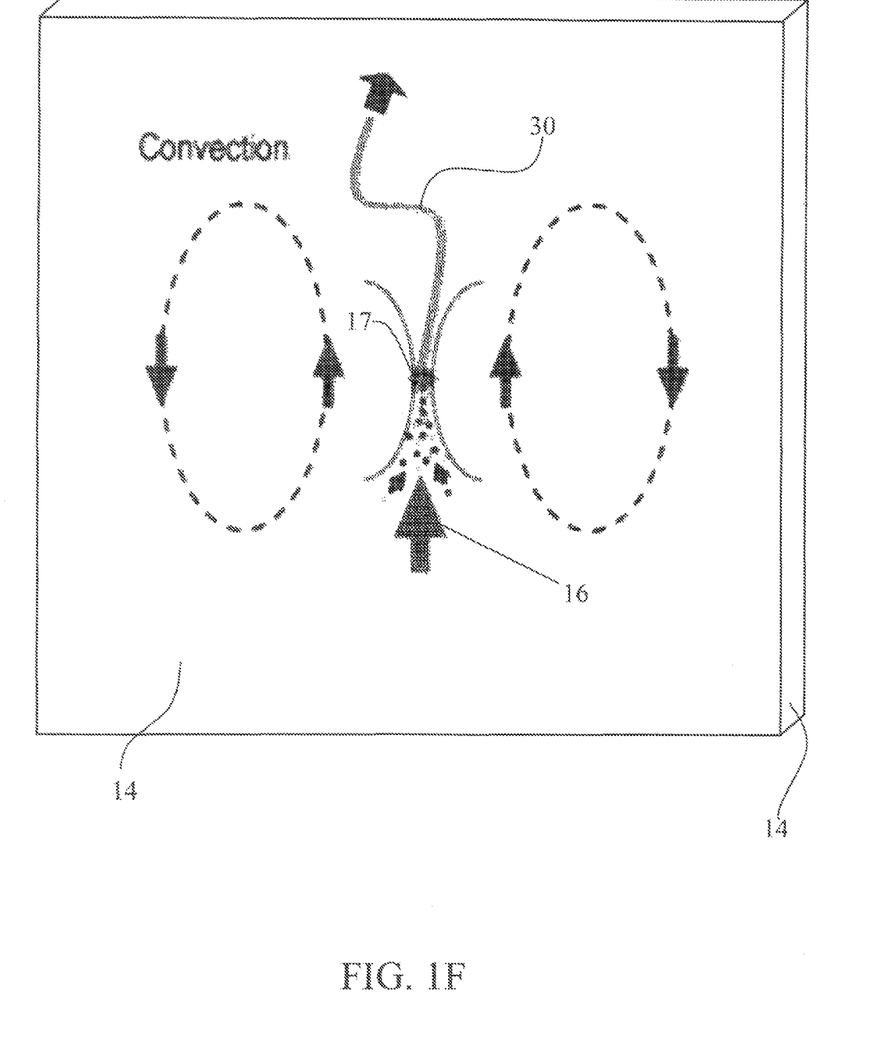
Figure 1G:
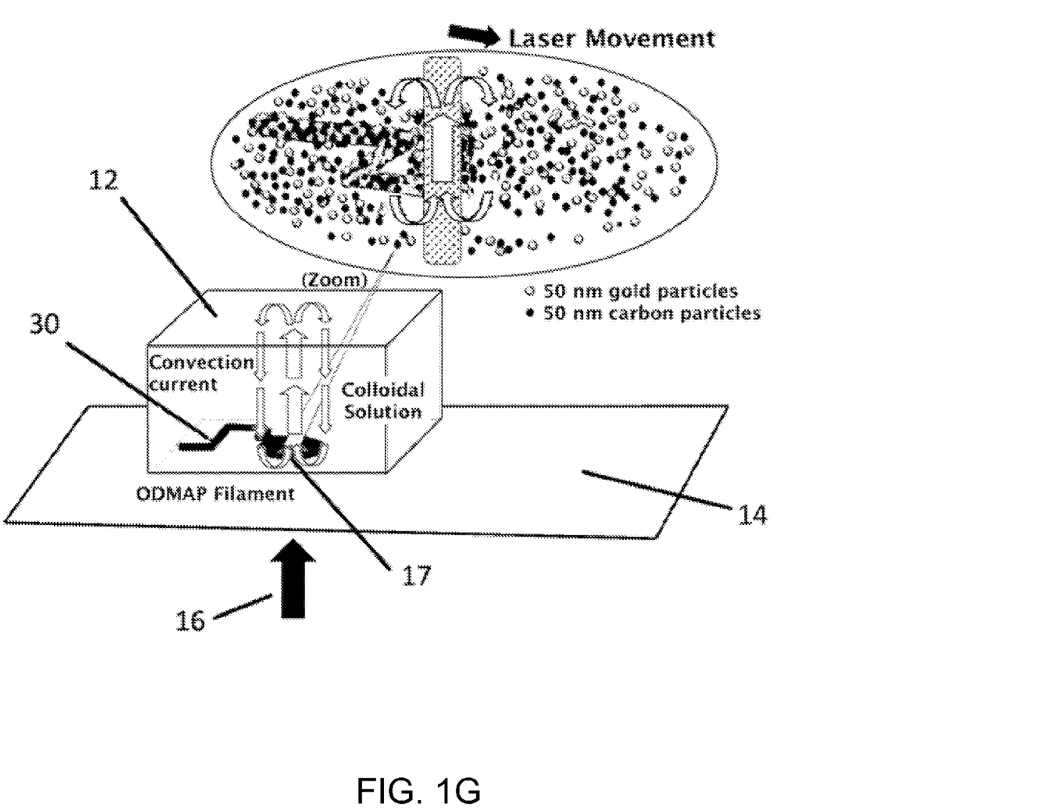

A salient feature of the invention is the use of convective vectoring of suspended nanoparticles to desired shapes and sizes. FIGS. 1F-1G provide schematics of this invented convection-induced particle-vectoring technique, with the inset providing detail as to laser placement. FIG. 1F shows how convection imposes a medial then lateral force to nanoparticles to draw them into the optical trap to be irreversibly fused together at the laser focus 17. The filament 30 grows from the laser focus 17 so as to push the filament outwardly in the direction of the arrow in the figure. This filament fabrication occurs within the colloidal droplet such that the filament fabrication occurs prior to complete evaporation of its droplet vehicle. Droplet volumes are determined so as to allow filament fabrication before solution evaporation. As such, the filaments are free floating within the droplet vehicle and not attached to the underlying substrate 14 supporting the solution. The filament forms above the substrate and within the solution. The convection configuration depicted in FIG. 1F corresponds to the OMD process discussed supra.

FIG. 1G schematic drawing shows how the nanoparticles (NP) are drawn into the optical trap from below by convection. The NPs are then irreversibly bound to underlying substrate 14 at the point of the laser focus. FIG. 1G corresponds to the ODMAP process outlined infra.

Placement of the focused radiation will optimize structure growth. As depicted in the inset in FIG. 1G, the laser 16 is focused near the center and bottom of the solution 12. As such, the laser tip is placed just ahead of the forming filament 30, and near the interface between the colloid and the support substrate 14. The filament is extended in size and length when the laser is moved away from the formed filament such that its focus remains near the bottom plane defined by the solution/substrate interface, thereby facilitating filament growth and attachment to the support substrate.

In instances where it is desirous for the filament not to be attached to a substrate, a laser is focused at or near a region of the solution defined by the glass-water-air interphase as this region is sufficiently high in concentration of nanoparticles due to the evaporating state (i.e., nonequilibrium state) of the solution.

The filament attachment process and the free filament production process can be used in conjunction with each other by changing the laser power input.

To understand filament growth during steady-state conditions, the inventors monitored the temporal behavior of the transmitted trap laser light under sub-threshold (low power) filament growth conditions. Trap loading, which precedes continuous filament growth, arises from two features: (i) particle diffusion into the trap-and-fusing region, and (ii) formation of a hydrothermal jet coincident with the optical trap that invokes convective (toroidal) loading. This toroidal loading increases filament growth rate. Localized heating, coupled with hydrodynamic forces, detach ligands from the metal particles, those ligands including, but not limited to citrate and tannate moieties. Carbon NPs then "wet" the gold NPs, leading to carbon-encapsulated gold NPs that subsequently can bind with one another. Carbon atoms have a tendency to wet the gold surface at 450 K. (The process initiates at a lower temperature of 400 K.)

For given colloidal composition, increased laser power results in increased convection velocities and higher deposition rates. For given laser power, as the gold fraction decreases, the gold-carbon and carbon-carbon collision frequencies become significant. This leads to increased gold-carbon wetting and higher filament growth rates at lower gold fractions. The net growth rate is dictated by the relative frequencies of coalescence and convection. Tuning these interactions at the nanoscale is key to controlling the dynamics of formation of structures from the nanoscale to mesoscale.

ODA Assembly Detail

Nanoparticles have been assembled into filaments to a length of at least 2000 millimeters. This is done through optically directed assembly (ODA), the attributes of this assembly process comprising low colloid concentrations, i.e, between approximately $10^{10}$ and $10^{13}$ NP's/ml) and low laser power (approximately 0.5 to 2.0 milliWatts). The inventors have found that ODA is optimized at or near the edge of the droplet, when the target droplet is in a non-equilibrium condition (e.g., the droplet is evaporating). Given these reaction parameters, the resulting filament does not adhere to the substrate but rather the filament is formed above the support substrate. The filaments are then simply mechanically removed from the substrate surface for use elsewhere. As such, this relatively low power process generates 3-D mesoscopic structures which do not adhere to their support substrate.

Embodiments of ODA assembly include a support substrate that is rigid, semi rigid or nonrigid. Preferably the support substrate upon which the colloidal mixture resides is not thermally conductive (i.e., it is not a heat sink) and therefore will not wick heat from the convection forming process.

In an embodiment of the invention, a weak laser is focused near the edge of an evaporating colloidal droplet containing inorganic and organic nanoparticles. Examples of inorganic particles include, but are not limited to, Au, Ag, silver oxide, nanocrystallline diamond, $TiO_2$, CuO, W, and combinations thereof.

Organic particles include carbon nanoparticles, carbon nanotubes, and polystyrene nanoparticles. Other group IV elements, such as silicon, have been used instead of or in combination with the carbon particles. Generally, most groups of the periodic table are suitable. Further, the geometries of the organic particles can vary. For example, the inventors found that the incorporation of carbon nanotubes enhances the porosity of the resulting composite structure.

The inventors have discovered that diamond suitably combines with carbon, titanium oxide suitably combines with silicon, copper oxide suitably combines with either carbon or silicon, carbon nanotubes work with gold, silver and silver oxide, and finally, silver oxide works with gold or silver.

Aside from the aforementioned radiation absorber particles, other materials can also be included, such as polystyrene, which are chosen to melt/vaporize/dissolve and therefore evacuate from the final structure to form nanoscopic voids via final heating or dissolution steps. One vetting method for choosing these materials is their relatively lower boiling point compared to the boiling points/melting points of the inorganic and organic materials. The evacuation of these lower boiling point materials from the final structure enhances the porosity of the structure. Another vetting method is where the porosity enhancers are chosen based on their solubility (relative to the metallic and nonmetallic NPs discussed supra).

In an example of incorporating the porosity enhancers, high porosity electrodes are fabricated by doping with dissolvable NP's (e.g. polystyrene) to produce nano-scopic voids in the composite matrix A range of weight percents of the polymer to the entire colloid entity is about 10-25 percent, depending on the extent of porosity desired.

The inventors found that when primary absorber carbon is added to a metallic NP, such as gold, the density of the resulting composite increases. However, when porosity enhancers are added to the colloid, density decreases to approximately the density of pure carbon.

Figure 2:
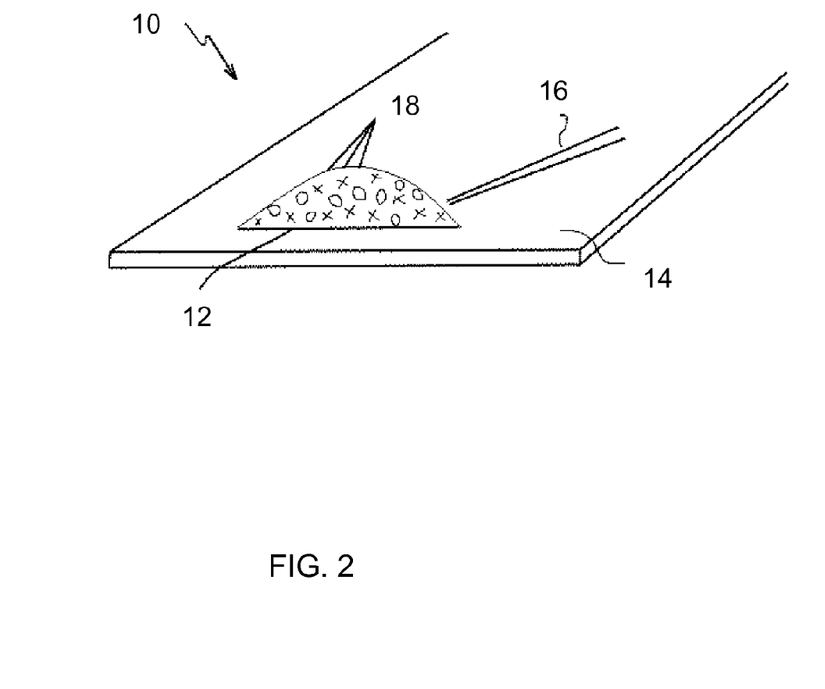
FIG. 2 is a schematic depiction of the invented process, in accordance with features of the present invention depicted in FIG. 1F.

FIG. 2 is a schematic depiction of the optically directed assembly process. The process, designated as numeral 10, begins with a solution 12 in non-equilibrium, such as in evaporation mode. The solution is supported on a nonabsorbing substrate 14, such as a rigid substrate, including, but not limited to, glass, ceramic, metal, plastic, composites, crystalline materials (e.g., quartz, sapphire), and combinations thereof. Non-rigid substrate is also suitable, such as fabric, Kevlar, and polyvinyl chloride, and combinations thereof. The substrates, be they rigid, semi-rigid or nonrigid, may also be flat, curved, or a combination thereof.

Aside from physical support structure, the solution can be supported in a containerless or surfaceless environment, such as by acoustic or electro-magnetic levitation. Levitation radiation is supplied via a myriad of commercially available systems, such as the Single-Axis Acoustic Levitator, manufactured by Materials Development Incorporation, Evanston, Ill.

In an embodiment of the ODA process, a weak (approximately 2 mW) focused laser 16 is moved around in a colloidal solution of gold and carbon nanoparticles, and most preferably near the edge of the bulk of the solution, for it is at the edge of the evaporating solution that the concentration of nanoparticles 18 is highest. The laser can be placed just outside the droplet but in close spatial relationship to the droplet, or contacting the edge, the surface, or the rim of the droplet, or within the confines of the droplet.

As the solution is heated, it evaporates further. The laser is moved to follow the shrinking droplet, leaving it its wake a composite of inorganic (e.g. metal) and organic or absorber (e.g., nonmetal) material, the composite defining a filament or fiber.

Through a combination of evaporation, optical trapping, convective forces, heating, and chemical interactions, the gold and carbon nanoparticles irreversibly fuse near the laser focus and complex 3-D structures can be formed near the surface of the colloidal droplet. This is due to the heat imposed by the laser to the solution. This leads to a controlled colloidal synthesis of stable, irreversible mesoscale filaments.

The ODA process occurs at low power compared to state of the art manipulation processes, with fabrications occurring within about 0.5 milliseconds. Using a colloidal droplet containing carbon and gold NPs, the inventors found that when a weak (~1 mW/0.3 µm$^2$) optical trap is positioned within ~30 µm of the droplet edge (e.g., outside of the droplet, or inside the droplet), continuous ODA of the mixed NPs occurs at the laser focus. In particular, because the NPs bind irreversibly in the trap, a real-time aggregation outcome results: The tiny (femto-liter, i.e., $1 \times 10^{-15}$ to $9 \times 10^{-15}$ liter) laser trap provides a mobile nucleation site, capable of spatially directing aggregation, forcing it to occur wherever the trap is moved.

An exemplary ODA process is found in Bahns, et al, *Physical Review Letters*, 106 095501 (2011), the entirety of which is incorporated herein by reference.

ODMAP Process
Detail

Another invented assembly method involves optically directed mesoscale assembly and patterning (ODMAP). Compared to the ODA process outlined supra, a relatively higher laser power is utilized with colloidal concentrations also higher than in the ODA process. The ODMAP process is applicable for solutions in both equilibrium and nonequilibrium conditions. The process results in the filaments thus formed being physically bonded to the underlying substrate. This is because the higher laser power overcomes the heatsink characterized by the underlying substrate so as to enable fusing of the forming inorganic/organic composite to the underlying substrate.

Figure 3:
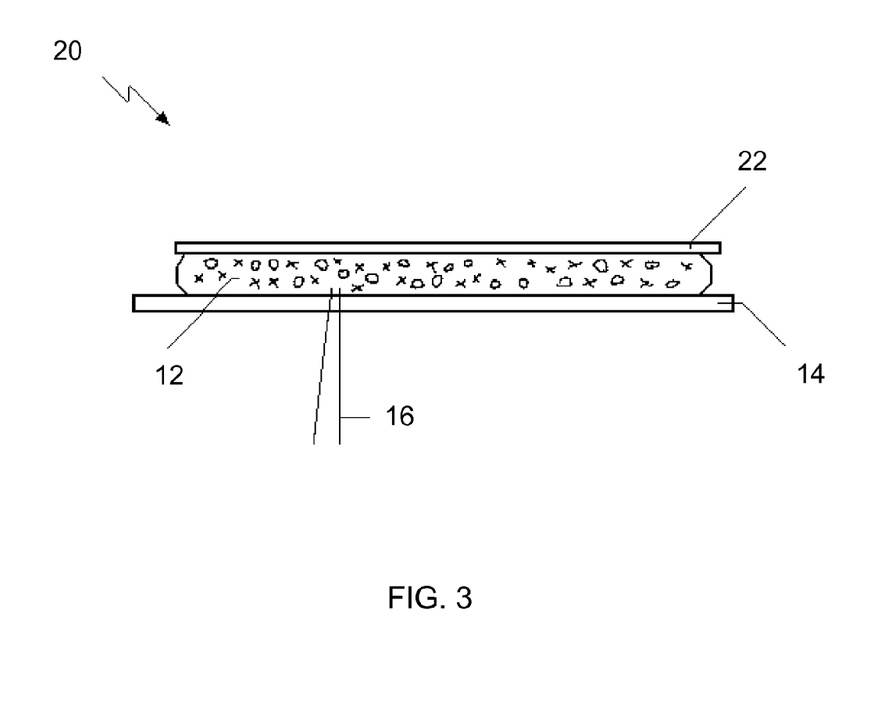
FIG. 3 is a schematic depiction of another invented process, in accordance with features of the present invention depicted in FIG. 1G.

FIG. 3 is a schematic view of the ODMAP process, the process designated as numeral 20 therein. In this process, a solution 12 is supported by a substrate 14, but also capped or otherwise sealed from above with a second substrate 22, such as a coverslip of a microscope slide. The coverslip 22 provides a means to maintain stable equilibrium conditions (i.e., prevent the droplet from evaporating). The coverslip provides a reflecting boundary for establishing convection current. While ODMAP process works in such sealed cell environs, the process is also operational with unstable solutions. However, the coverslip 22 is not an essential feature to enable the ODMAP process as the process can be performed with both unequilibrated and equilibrated solutions.

As in the ODA process incoming radiation is provided with a laser 16 such that the laser either contacts the solution directly, or after first traveling through either the substrate 14 (or the ODMAP instance, the second substrate 22).

As with the aforementioned ODA process, ODMAP is capable of producing intricate patterns or circuits, although now in 2-D. Specifically, ODMAP allows intricate 2-D mesoscale patterns of gold-carbon filaments (or other organic-inorganic hybrid materials) to be deposited on glass. ODMAP differs from ODA in three key aspects:

(1) It requires roughly 5-10-fold increases in optical intensity and NP concentration, although these are still relatively moderate and easily achievable.
(2) It is unrestricted in terms of equilibrium/nonequilibrium conditions, which is to say that the ODMAP process is achievable if solution is not initially provided in a nonequilibrium state.
(3) It gives rise to NP structures physically bound to underlying substrate, such as glass.

The first aspect above is due to the higher thermal load for particles physically bound to glass (as opposed to particles above the glass). The second aspect allows the use of equilibrium conditions (enabling "unlimited" lengths scales, currently exceeding 1 cm, in two-dimensions, sealed chambers, etc.).

The third aspect gives rise to microstructures that can survive a wide variety of post processing. It is the embodiment of a catalyzed condensation reaction between the siloxane groups of the glass support substrate 14 and the carbon-hydroxyl moiety contained in the carbon nanoparticle feedstock. Specifically, the inventors found that the metal nanoparticles (i.e., gold, silver, or other metal component) facilitate covalent bonding between the silicon of the glass support substrate and the carbon of the organic-inorganic composite, with water as the leaving group. The result is a an Si—O—C chemical bond or a siloxane-like moiety such as Si—O—Si.

Initiation of the ODMAP process can occur by positioning the laser spot on an opaque cluster of NPs on the laser transparent surface. After formulation of the initial surface-adhering structures, these structures can be post-processed into more complex compositions. For example, the structures can be rinsed and blow dried. Then more colloid or a different colloid can be added and either the ODA or ODMAP process can be repeated.

Each of the ODA and ODMAP modes creates composite nanomaterials in 2 or 3 dimensions. The processes add functionality to direct-write micro-circuits used in sensors, electrodes for super-capacitors, lithium-ion batteries, fuel cells, and as catalysts for biocompatible drug delivery systems. Once initiated, the invented processes are self sustaining, provided nanoparticle feedstock is available.

Filament Fabrication
Process Detail

In an embodiment of the invention, a low-power laser—similar in intensity to ones used in office laser pointers—is directed into a solution of gold and carbon nanoparticles suspended in water. Surprisingly and unexpectedly, the inventors found that the carbon nanoparticles decomposed or deformed to create a kind of "glue" that enabled the creation of long gold and carbon chains that assembled continuously wherever the laser was pointed.

The invented optically directed assembly works via convective flow. Generally, when a light source such as a laser, heats up the spot in a solution onto which it is focused, "convective flow" occurs, which induces the solution to travel around the hot spot. The action of the flow combined with laser heating causes the particles, suspended in the solution, to come together thereby creating filaments.

A laser at between 400 and 500 nm (e.g., 488 nm), with power in the range 10-25 mW, coupled to a 60×/1.2 water immersion objective was utilized to achieve ODMAP. Gold NP concentrations range from $2\text{-}4 \times 10^{11}$ cm$^{-3}$ (with gold NP fractions in the range 0.3-0.5). Citrate stabilized gold NPs ($4.5 \times 10^{11}$ cm-3) are concentrated by centrifuge at 5,000 rpm for 10 minutes, and redispersed by ultrasonication. The carbon NP's were treated as disclosed in Bahns et al, *Phys. Rev. Lett.* 106, 095501 (2011), the entirety of which is incorporated by reference.

Using a colloidal droplet containing carbon and gold NPs, the inventors found that if a moderately weak (>10-25 mW, 0.3 µm$^2$ @ 488 nm) optical trap is positioned at the colloid glass interface, ODMAP of the mixed colloid particles will occur, leading to a securely attached NP assembly on the glass surface. These assemblies can be post processed in more complex compositions (for example, rinse and blow dry, add more colloid, repeat, change to different colloid, repeat). Hence, by moving the optical trap laterally (x-y), the drawing of complex 2-D patterns is possible (3-D formations are possible as well, since the trap can be moved vertically above the glass surface).

Figure 4:
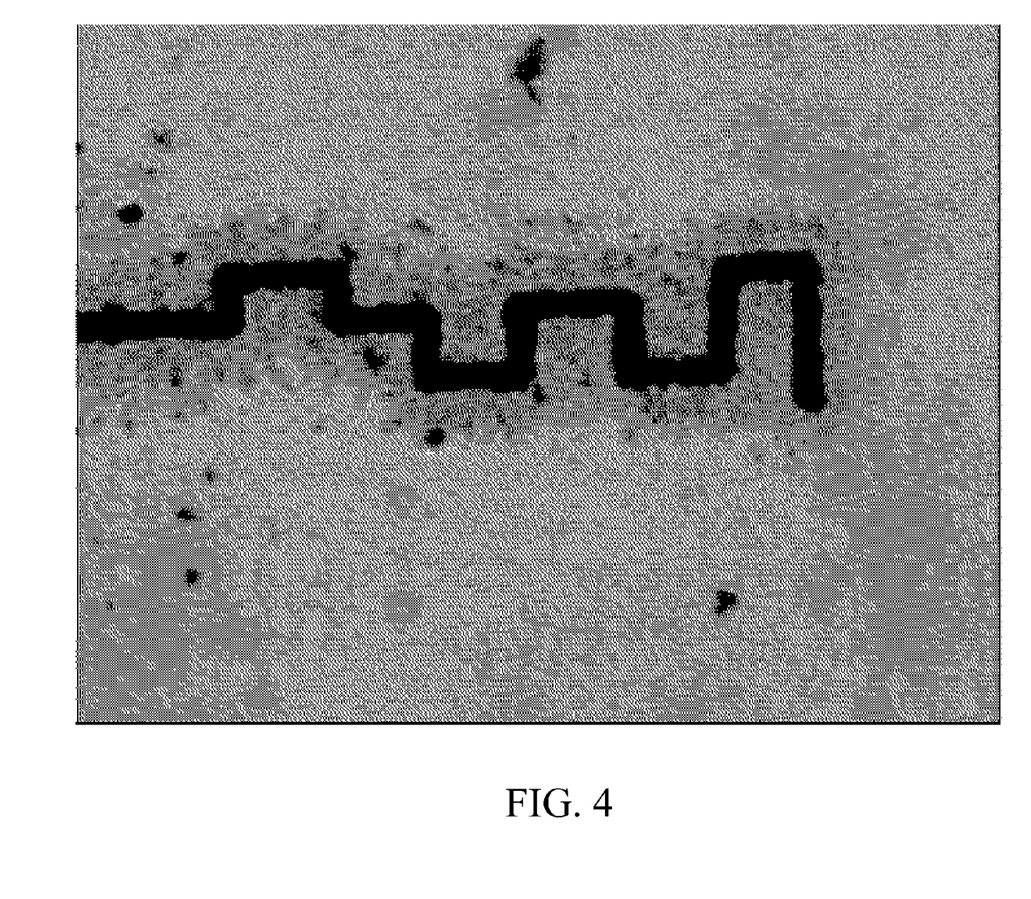
FIG. 4 is a photomicrograph of ODMAP filament on glass, in accordance with features of the present invention.

FIG. 4 is a photomicrograph of ODMAP filament on glass, as produced by the invented method. This figure is an optical image of a gold/carbon filament having a width of approximately three microns, the filament obtained by ODMAP when an optical trap at 20 mW is scanned along the glass surface at a continuous speed.

Figure 5:
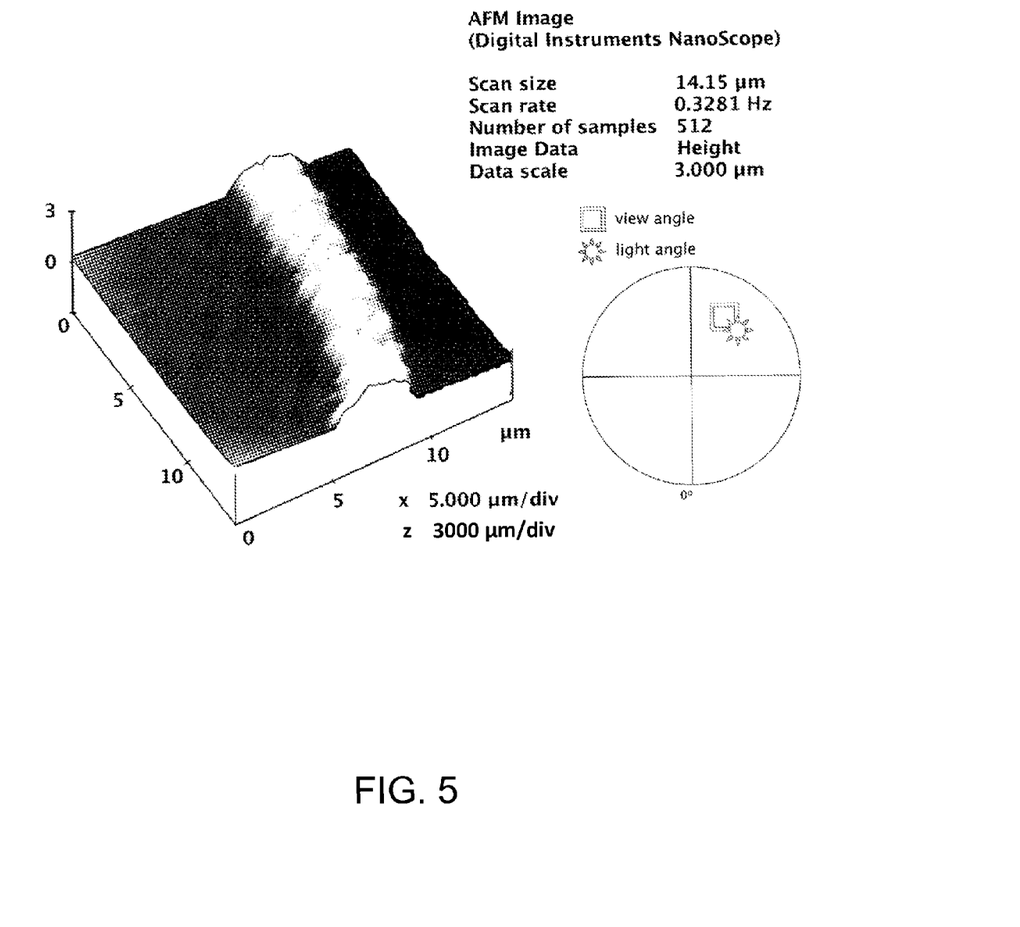
FIG. 5 is an AFM image of a three micron wide filament produced by the invented method, in accordance with features of the present invention.

FIG. 5 is an Atomic Force Microscope (AFM) image of a three micron wide filament produced by the invented method. Depending on scan speed, pattern widths typically vary from 0.5 to 4 microns. Based upon linear extrapolation for a concentrated colloid of $10^{14}$ NP/cm$^3$, estimated speeds for 1 mW, 1 Watt, and 1 kiloWatt are $\sim 10^3$, $10^6$, and $10^9$ micrometers/s, respectively. This assumes convective flow velocities also scale linearly with laser power. However, as mentioned supra very high colloidal flow speeds can be produced by mechanically pumping colloids.

ODMAP at the colloid/glass interface displays a clear threshold in optical intensity that depends on the local opacity at the glass water interface. Preferably, at the optical power levels in the range 10-25 mW, ODMAP is initiated (for example by positioning the laser spot on an opaque cluster of nanoparticles on the glass surface). Once initiated, the ODMAP process is self-sustaining.

The additional heating due to the increased laser powers in the ODMAP process (compared to the ODA process), leading to greater heating and convective forces as well as some additional heating due to the metal plasmonic interactions (whereby the metallic particles absorb energy as well), are sufficient to result in particle-particle fusion. This feature is also responsible for the greater control over the process, and the new feature that the assemblies physically bind to the glass.

As with the invented ODA process, chemical interactions play a role in ODMAP, with carbon serving as the "glue" that facilitates assembly. Carbon facilitates the assembly of the metal NPs and their binding to the glass. The inventors also found that ODMAP can occur with other binary materials. For example, the inventors observed ODMAP with silver and carbon NPs, with gold and single-walled carbon nanotubes and with silicon as the primary radiation absorber in conjunction with gold.

Articles produced by the method have an electrical conductivity of about $10^2$ to $10^5$ S/cm. In a preferred embodiment of the present invention, a focused laser spot directs colloidal assembly of nanoparticles into electrically conductive organic-inorganic hybrid mesoscale filaments with arbitrary permanent patterns on a glass surface. The structures fabricated from colloids containing carbon and gold exhibit ohmic conductivities of about 430 S/cm, and form with high deposition rates of about 1000 to 3000 µm$^3$/s. For example, in ODMAP processes for a 50:50 carbon:gold colloid, the inventors found an ODMAP deposition rate of about 2000 µm$^3$/s at 20 mW and total particle concentration 1 particle/µm$^3$. For filaments with 6 µm diameter, the inventors estimate write speeds of about 70 to 200 µm/s. For laser power in the range 0.01-10.0 Watts, the deposition rates should be in the range $\sim 10^2\text{-}10^8$ cubic micrometers/second, with write rates in the range 10-10$^7$ micrometers/second.

Optically-directed mesoscale assembly and patterning operates through optical trapping, convective fluid flow and chemical interactions forcing nanoparticles to fuse near the laser focus and to continuously grow as the spot is moved along the glass-colloid interface. The optical trap acts as a heat source that induces hydrothermal convection within the colloid owing to buoyancy effects. Gravity causes upward movement of the lighter fluid while the heavier fluid flows downward. The hydrothermal toroidal convection current acts in conjunction with the optical trap allowing us to pattern arbitrary mesoscopic 2-D structures on a glass substrate.

Fluid velocities can range up to 1000-2200 µm/s for 20 mW power and $10^{11}$ NP/cm$^3$. Such fluid flow can concentrate the particles near the optical trap. with significant heating near the laser focus. Temperature is maximum near the particle surface and rapidly falls further into the fluid The invented technique is simple but allows near instantaneous hierarchical assembly and patterning of hybrid materials.

Figure 6:
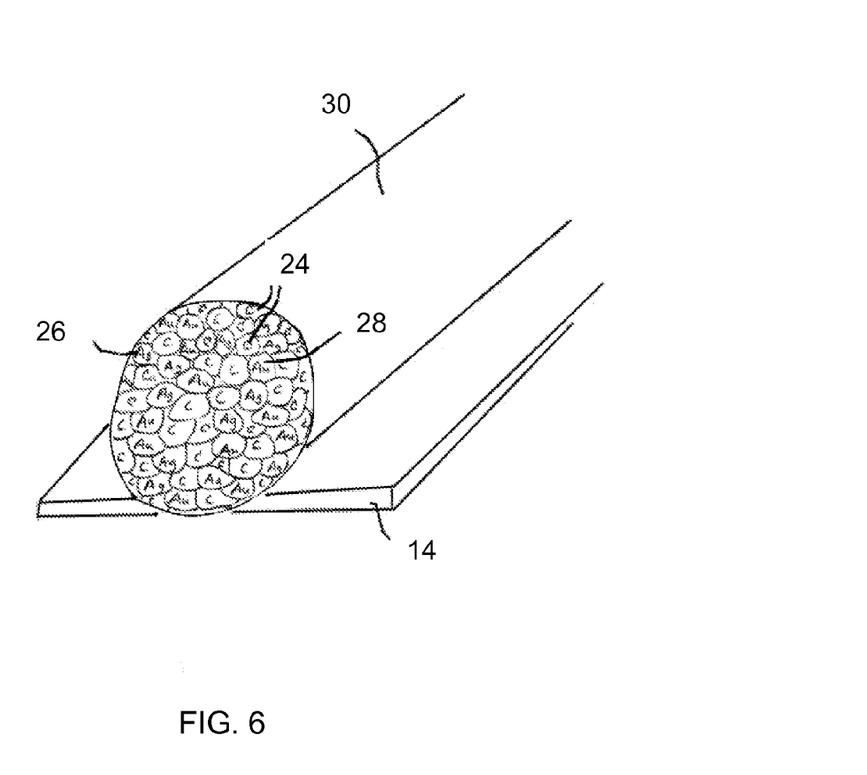
FIG. 6 is a schematic perspective diagram of a filament produced in accordance with features of the present invention.

Transmission electron microscopy (TEM) images of the related ODA filaments and MD calculations show that the ODMAP filaments are composed of metal NPs surrounded by amorphous carbon (or other absorbing species such as silicon) acting as glue. FIG. 6 is a schematic depiction of a filament so formed from either the ODA or the ODMAP processes. This depiction shows an amalgam of gold (Au), silver (Ag) and carbon (C) nanoparticles. Generally, the carbon nanoparticles provide a matrix for affixing the silver particles 26 and gold particles 28, thereby forming a matrix. The cross section of the matrix is an embodiment of a laser focus point, such that a plurality of such focus points are utilized to create the filament 30 as shown.

Figure 7:
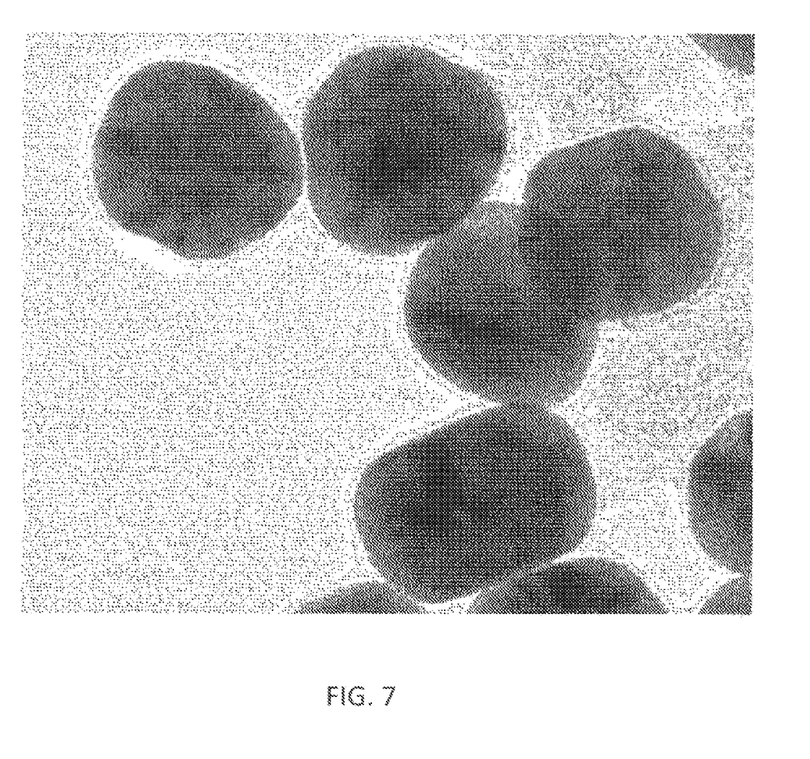
FIG. 7 is a TEM image of a carbon-gold filament, in accordance with features of the present invention.

FIG. 7 is a TEM image of a carbon-gold filament. It depicts 50 nm sized gold particles (dark spheres) encapsulated by carbon (light areas surrounding the spheres). Substantially all of the metallic particles are physically contacting other metallic particles.

The inventors found that embodiments of the filaments are typically composed of carbon with metallic fraction varying form about 5 to 40 percent. For example, a carbon-gold embodiment has between about 9 and 30 percent gold. ODA and ODMAP filaments, owing to their high amorphous carbon content, should have mechanical properties intermediate between amorphous carbon and gold.

AFM images reveal that the ODMAP filaments have somewhat rougher surface features than ODA ones, presumably due to differences in the convection patterns for the two processes: ODA causes the NPs to flow parallel to the filament axis (see FIG. 1F), while ODMAP cause an NP flow pattern that is at an angle to the growing filament's longitudinal axis. FIG. 1G depicts ODMAP filament construction wherein the convection flow pattern is substantially perpendicular to the growing filament's longitudinal axis.

Figure 8A:
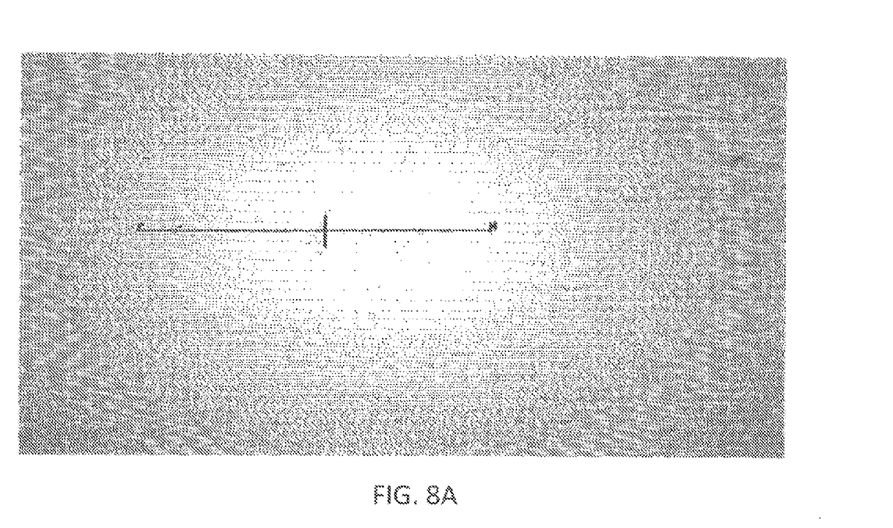
FIG. 8 is a photomicrograph of a diode produced by the invented filaments, in accordance with features of the present invention.

Practical applications for the invented nanoparticle manipulation process include circuit building. FIG. 8A shows a 40× magnification of a solid state diode written using ODMAP (the single PN junction is the vertical structure in the center). The left half of the device (labeled with "P") is composed of P-type material (consisting of 50 nm silicon NPs doped with 40 nm CuO NPs). The right half of the device (labeled with "N") is composed of N-type material (consisting of 50 nm silicon NPs doped with 8 nm $TiO_2$ NPs.

Figure 8B:
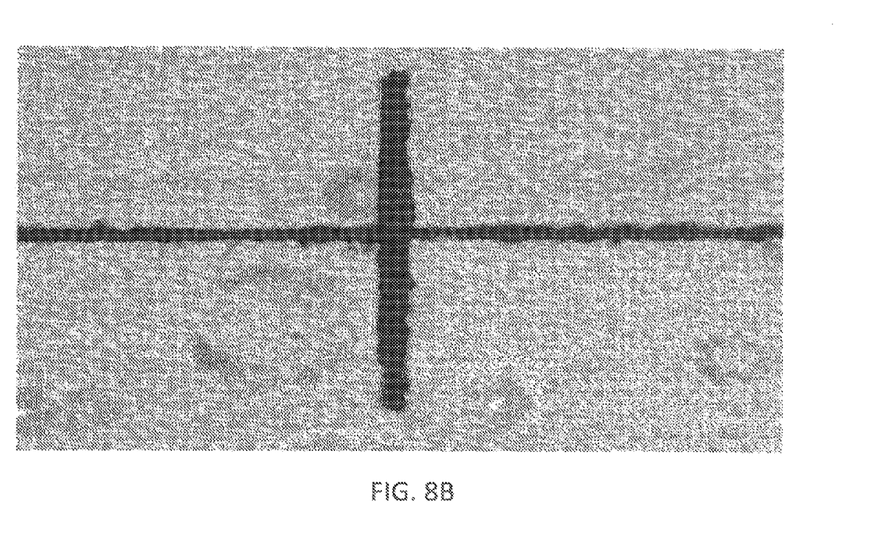

FIG. 8B is a 100× magnification of the PN junction (vertical structure in the center).

Other diodes have been fabricated with the invented nanoparticle assembly technique. The other diodes comprise carbon nanotubes (instead of silicon) as primary radiation absorbers. Also, these other diodes use indium tin oxide (ITO) instead of $TiO_2$. In an embodiment of this other diode, the N-Type material is composed of about 8 nm carbon nanotubes doped with about 45 nm $In_2O_3$—$SnO_2$. The P-Type material is composed of about 8 nm carbon nanotubes doped with about 40 nm CuO (also known as Copper (II) oxide).

It is to be understood that the above description is intended to be illustrative, and not restrictive. The above-described embodiments (and/or aspects thereof) may be used in combination with each other. In addition, many modifications may be made to adapt a particular situation or material to the teachings of the invention without departing from its scope. The incorporation of carbon nanotubes to supplement or replace amorphous carbon fraction will render the resulting composites mechanically semi-rigid to rigid, while also increasing their porosities. As such, the incorporation of nanotubes will confer flexibility to the final structure.

The invented process provides for reversibly flexible, stretchable electronics and conduits. The application of these new materials in communications, neural probes, biotic-abiotic interfaces and drug delivery systems is therefore enabled. Furthermore, these flexible substrates can be used as subunits in constructing larger filaments, strands and cables.

While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The invention claimed is:

1. A method for manipulating and fusing nanoparticles, the method comprising:
   a. providing a solution of nanoparticles;
   b. focusing radiation to a point in close spatial relationship to the solution for a time and at a power level sufficient to cause the nanoparticles to attach to each other and form a filament wherein the radiation is placed just ahead of the forming filament; and
   c. moving the radiation to direct attachment of additional nanoparticles so as to produce a continuous mesoscale filament and to direct the overall pattern formed by the filament via convective vectoring.

2. The method as recited in claim 1 wherein the nanoparticles are between 1 nm and 1000 nm in diameter.

3. The method as recited in claim 1 wherein the particles comprise elements selected from the group consisting of gold, silver, tungsten, copper oxide, titanium oxide, and combinations thereof.

4. The method as recited in claim 1 wherein the radiation is at a power sufficient to cause the filament to attach to a foundation substrate.

5. The method as recited in claim 1 wherein the radiation has a power of between about 0.5 mW and 40 mW.

6. The method as recited in claim 1 wherein the solution is in a non-equilibrium condition.

7. The method as recited in claim 1 wherein the solution is in an equilibrium condition.

8. The method as recited in claim 1 wherein the solution is provided on a substrate selected from the group consisting of glass, plastic, metal, silicon, ceramic, quartz, sapphire, and combinations thereof.

9. The method as recited in claim 1 wherein radiation is in the form of a laser and the filament forms simultaneously with moving the laser.

10. The method as recited in claim 1 wherein the filament lengths up to $2\times10^{-2}$ meters are achieved.

11. The method as recited in claim 1 wherein the radiation contacts the solution.

12. The method as recited in claim 1 wherein the radiation is within 50 microns of the edge of the solution.

13. The method as recited in claim 4 wherein the laser is within 30 microns of a solution-substrate interface.

14. A method for manipulating and fusing nanoparticles, the method comprising:
  a. providing a solution of nanoparticles;
  b. focusing radiation to a point in close spatial relationship to the solution for a time and at a power level sufficient to cause the nanoparticles to attach to each other; and
  c. moving the radiation to direct attachment of additional nanoparticles so as to produce a continuous mesoscale filament and to direct the overall pattern formed by the filament 1 wherein the particles are nonmetallic and metallic moieties and the ratio of nonmetallic to metallic moieties is between about 10:90 and 90:10.

15. The method as recited in claim 14 wherein an article as produced has an electrical conductivity of about $10^2$ to $10^5$ S/cm.

16. The method as recited in claim 14 wherein the nanoparticles are between 1 nm and 1000 nm in diameter.

17. The method as recited in claim 14 wherein the particles comprise elements selected from the group consisting of gold, silver, tungsten, copper oxide, titanium oxide, and combinations thereof.

18. The method as recited in claim 14 wherein the radiation is at a power sufficient to cause the filament to attach to a foundation substrate.

19. The method as recited in claim 14 wherein the radiation has a power of between about 0.5 mW and 40 mW.

20. The method as recited in claim 14 wherein the solution is in a non-equilibrium condition.

21. The method as recited in claim 14 wherein the solution is in an equilibrium condition.

22. The method as recited in claim 14 wherein the solution is provided on a substrate selected from the group consisting of glass, plastic, metal, silicon, ceramic, quartz, sapphire, and combinations thereof.

23. The method as recited in claim 14 wherein radiation is in the form of a laser and the filament forms simultaneously with moving the laser.

24. The method as recited in claim 14 wherein the filament lengths up to $2\times10^{-2}$ meters are achieved.

25. The method as recited in claim 14 wherein the radiation contacts the solution.

26. The method as recited in claim 14 wherein the radiation is within 50 microns of the edge of the solution.

27. The method as recited in claim 14 wherein the radiation is within 30 microns of the solution.

* * * * *